United States Patent
Gold et al.

(10) Patent No.: US 11,430,022 B1
(45) Date of Patent: Aug. 30, 2022

(54) ENROLLMENT VERIFICATION IN ENERGY MANAGEMENT

(71) Applicant: EnergyHub, Inc., Brooklyn, NY (US)

(72) Inventors: Jonah Gold, Brooklyn, NY (US); Michael DeBenedittis, Brooklyn, NY (US); William Cybriwsky, Brooklyn, NY (US); Laura Seidman, New York, NY (US)

(73) Assignee: Energy Hub, Inc., Brooklyn, NY (US)

( * ) Notice: Subject to any disclaimer, the term of this patent is extended or adjusted under 35 U.S.C. 154(b) by 240 days.

(21) Appl. No.: 16/102,215

(22) Filed: Aug. 13, 2018

Related U.S. Application Data (60) Provisional application No. 62/546,070, filed on Aug. 16, 2017.

(51) Int. Cl.
| | |
|---|---|
| *G06Q 30/02* | (2012.01) |
| *G06Q 50/06* | (2012.01) |
| *F24F 11/46* | (2018.01) |
| *F24F 11/62* | (2018.01) |
| *F24F 140/60* | (2018.01) |

(52) U.S. Cl.
CPC .......... *G06Q 30/0281* (2013.01); *F24F 11/46* (2018.01); *F24F 11/62* (2018.01); *G06Q 50/06* (2013.01); *F24F 2140/60* (2018.01)

(58) Field of Classification Search
CPC ..... G06Q 30/0281; G06Q 50/06; F24F 11/62; F24F 11/46; F24F 2140/60
See application file for complete search history.

(56) References Cited

U.S. PATENT DOCUMENTS

| | | | |
|---|---|---|---|
| 7,908,116 B2 | 3/2011 | Steinberg | |
| 8,386,087 B2 | 2/2013 | Spicer | |
| 2009/0292566 A1* | 11/2009 | Bossert | G06Q 10/02 705/5 |

(Continued)

OTHER PUBLICATIONS

Yener, Baris, Tascikaraoglu, Akin, Erdinc, Ozan, Baysal, Mustafa, and Catalao, Joao P.S., "Design and Implementation of an Interactive Interface for Demand Response and Home Energy Management Applications," Applied Sciences, 7, 641, Jun. 21, 2017.*

(Continued)

*Primary Examiner* — Nathan Erb
(74) *Attorney, Agent, or Firm* — Fish & Richardson P.C.

(57) ABSTRACT

Techniques for energy management including enrollment using verification technology. In some implementations, a computing device receives applicant data to execute an enrollment application for an applicant applying for a particular energy management program. The computing device receives grid operator data from a grid operator to verify against the applicant data. The computing device determines whether the applicant data verifies to the grid operator data. The computing device generates an enrollment recommendation that corresponds to the applicant for the particular energy management program in response to determining whether the applicant data verifies to the grid operator data. The computing device provides the enrollment recommendation to a grid operator for review of whether to accept or reject the applicant to the particular energy management program.

20 Claims, 6 Drawing Sheets

(56) References Cited

U.S. PATENT DOCUMENTS

| | | | |
|---|---|---|---|
| 2011/0087695 A1* | 4/2011 | Sharma | G06F 40/279 707/769 |
| 2011/0137745 A1* | 6/2011 | Goad | G06Q 30/0282 705/26.9 |
| 2011/0264291 A1* | 10/2011 | Le Roux | G06Q 30/02 700/291 |
| 2012/0136496 A1 | 5/2012 | Black | |
| 2013/0144451 A1 | 6/2013 | Kumar | |
| 2014/0031991 A1* | 1/2014 | Bergman | H04L 29/06 700/276 |
| 2014/0277761 A1 | 9/2014 | Matsuoka | |
| 2014/0277769 A1 | 9/2014 | Matsuoka | |
| 2015/0237469 A1* | 8/2015 | Stephens | H04M 3/42357 455/404.2 |
| 2015/0248118 A1 | 9/2015 | Li | |
| 2016/0328869 A1* | 11/2016 | Nielsen | G06K 9/00 |
| 2016/0373453 A1* | 12/2016 | Ruffner | H04W 12/06 |
| 2017/0123390 A1* | 5/2017 | Barco | G05B 15/02 |
| 2017/0207629 A1* | 7/2017 | Seki | G06Q 10/06312 |
| 2017/0357224 A1* | 12/2017 | Berrien | F24F 11/62 |
| 2018/0100663 A1* | 4/2018 | Crimins | G05B 19/048 |
| 2018/0349487 A1* | 12/2018 | Garg | G06F 16/289 |

OTHER PUBLICATIONS

Chen et al., "Demand Response-Enabled Residential Thermostat Controls," ACEEE, 2008, 1-24-1-36.

Honeywell, "Honeywell Wi-Fi Thermostats Allow Homeowners To Connect With Utilities And Turn Up The Savings," Honeywell, Oct. 2013, 1-3.

Para, "Nest Thermostats: The Future of Demand Response Programs?," Powermag, Jul. 2014, 6 pages.

Yoav, "What is Demand Response?," Simple Energy, Jun. 2015, 1 6.

* cited by examiner

ENROLLMENT VERIFICATION IN ENERGY MANAGEMENT

CROSS-REFERENCE TO RELATED APPLICATION

This application claims the benefit of U.S. Provisional Application No. 62/546,070, filed Aug. 16, 2017, and titled "Enrollment Verification Technology," which is incorporated by reference.

BACKGROUND

This specification relates to enrollment verification and more specification to enrollment verification in energy management systems.

SUMMARY

The subject matter of the present disclosure is related to techniques for providing enrollment verifications to users in a selected energy management program. In particular, when a user or applicant applies to an energy management program, the user may be evaluated for enrollment eligibility in the energy management program. The technology of the present disclosure describes systems and methods for performing enrollment verification in energy management systems. These systems can evaluate an enrollment eligibility of a user applying to an energy management program, and generate an enrollment recommendation based on the evaluation. The enrollment recommendation may be provided to a grid operator for review of the recommendation, to determine whether to accept or reject the request for enrollment.

These systems can be used to provide enrollment recommendations by comparing user data, such as an address of a site associated with a particular user, and grid operator data, such as pre-validated addresses of sites. For example, a user may input various information, such as a name and/or address, when applying for enrollment in a particular energy management program. The information supplied by the user may be evaluated by enrollment verification technology using pre-validated information or data. The evaluation may be used to generate an enrollment recommendation. The enrollment recommendation may be provided to the grid operator for review in determining whether or not to admit the applicant into the particular energy management program.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
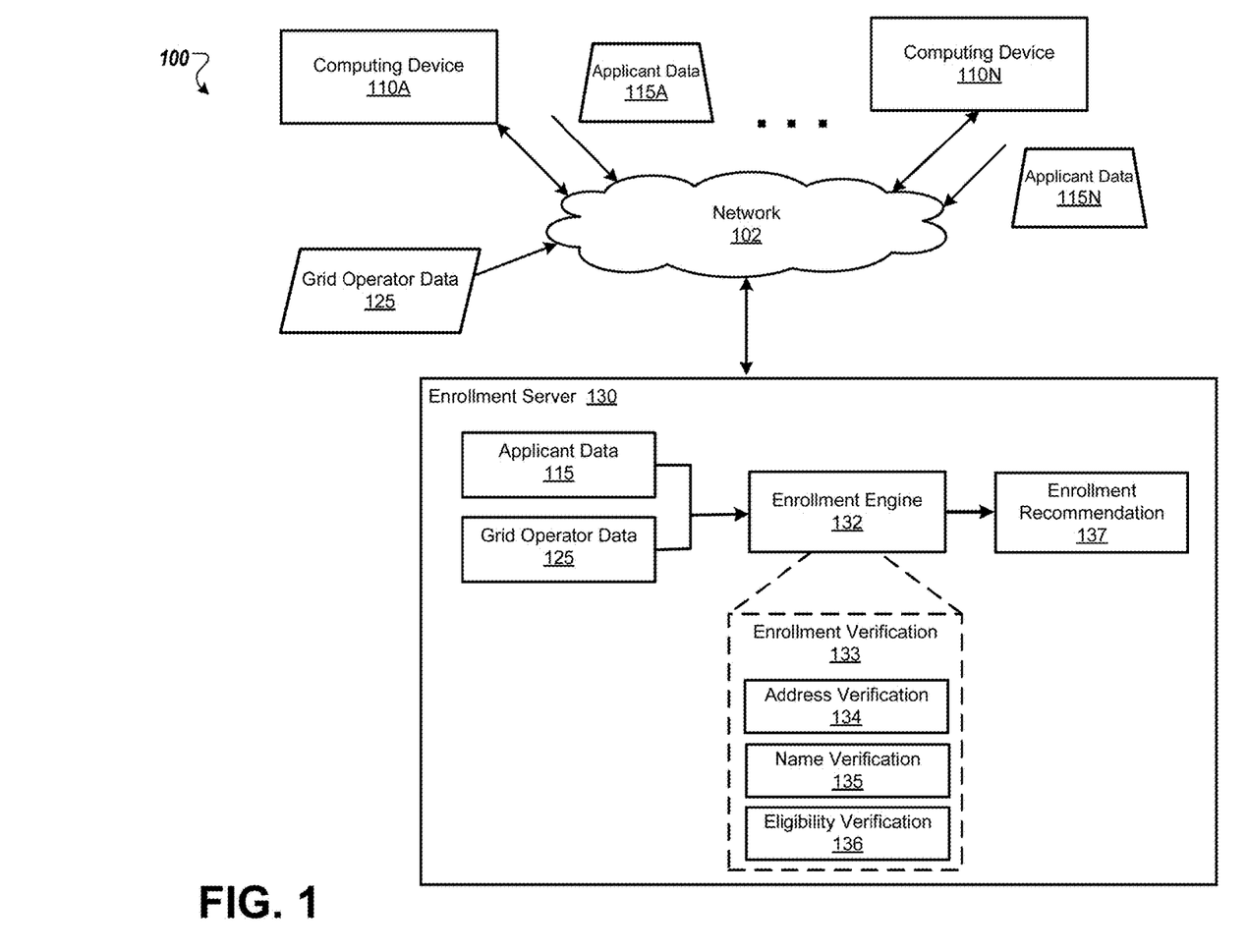
FIG. 1 is a diagram of an example system for enrollment verification.

FIG. 1 is a diagram of an example system 100 for enrollment verification. The system 100 includes computing devices 110A-N and an enrollment server 130 that are connected via a network 102. The network 102 can include any network that is known such as a local area network (LAN), a wide area network (WAN), the Internet, or any combination thereof. The system 100 may include many different computing devices 110A-N and enrollment servers 130. The system 100 can be an energy management system that can include various components for utility applications, energy monitoring and consumption applications, grid operation applications, and energy retailing applications, to name a few examples.

The computing devices 110A-N can include one or more computing devices such as a laptop, desktop, smartphone, tablet, or any other computing device that is known. The computing devices 110A-N can be used to receive applicant/user input, and transmit the applicant input to the enrollment server 130 by the network 102. The computing devices 110A-N may each provide a user interface for applying to an energy management program. Users may provide input at the computing devices 110A-N, and the input may be transmitted to the server 130 to determine whether or not the user is eligible to enroll in the energy management program. For example, a user may provide applicant data 115 when applying to a particular energy management program of a grid operator. The applicant data 115A-N may include an address of a site associated with the user, a name of the user, and the like. In this instance, the user may apply to enroll a energy management device in the particular energy management program by inputting applicant data 115 at a particular computing device 110.

The energy management devices can include energy consuming systems, energy consuming devices, and/or energy controls for energy consuming devices such as an HVAC system, a thermostat, a heating/pump system, an electric vehicle, a solar-power system, electric resistive or heat pump water heater, a smart inverter, residential battery systems, and the like. The energy management devices can each be associated with a particular site of the user or applicant, such as a house, an apartment, a floor of a building, a particular room in a house, apartment, or building, and the like. The energy management devices can be configured to adjust energy consumption of energy consuming devices at the sites via control units located at the sites. For example, if a particular energy management device corresponds to an HVAC system that connects to a thermostat, the particular consumption system can monitor temperature at the site and adjust the temperature of the thermostat to a desired temperature. By adjusting the temperature of the thermostat, the energy management device is adjusting the energy consumption of the HVAC system at the site.

The applicant data 115A-N may be associated with the energy management devices of the users. The applicant data 115A-N can include historical data corresponding to each of the energy management devices. For example, if a particular energy management device corresponds to an HVAC system connected to a thermostat, the applicant data 115 can include previous temperature data as well as HVAC runtime data. Further, the applicant data 115 can include an indication of previously implemented control adjustments to a particular consumption system. For example, the applicant data 115 can include data that indicates temperature adjustment level information and a duration of the temperature adjustments for a particular consumption system such as an HVAC system The grid operator data 125 can be provided to the enrollment server 130 via the network 102. The grid operator data 125 can include user data and grid operator parameters. Specifically, the user data can include previously stored user addresses, user names, and other user information. The grid operator data 125 may be stored in a grid operator database. For example, the enrollment server 130 may transmit all received applicant data 115A-N for storage to a grid operator database. In this instance, the previously stored applicant data may be accessed for future use in the verification of newly enrolling users. On the other hand, the grid operator parameters can include restrictions or guidelines that are determined by a grid operator. The grid operator parameters can define neighborhoods, or geographic regions of sites that are eligible and/or ineligible to participate in certain energy management programs. As such, the grid operator data 125 may be transmitted to the enrollment server 130 to aid in the determination of whether or not a particular user is eligible for enrollment in an energy management program.

The enrollment server 130 can be connected to the computing devices 110A-N via the network 102. The enrollment server 130 can be configured to receive applicant data 115 of the computing devices 110 and grid operator data 125 via the network 102. Additionally, the enrollment server 130 can be configured to generate enrollment recommendations for users applying to energy management programs, in response to receiving the applicant data 115 and the grid operator data 125. The enrollment recommendations can be based on enrollment verification, that is determined from the received data. In some examples, the enrollment recommendations may be comprised of the verified information determined from the received data.

The enrollment server 130 can be configured to align the received applicant data 115 and the grid operator data 125. The applicant data 115 and the grid operator data 125 can be aligned for processing. For example, the applicant data 115 can be matched with the grid operator data 125 so that the enrollment server 130 may verify a user applying for enrollment in a particular energy management program. The enrollment server 130 can be configured to pass the aligned data to an enrollment engine 132. The enrollment engine 132 can be configured to validate the users applying for enrollment by enrollment verification 133. The enrollment verification 133 can include various comparisons between the applicant data 115 and the grid operator data 125.

The enrollment engine 132 can be configured to perform address verification 134. In this instance, the enrollment engine 132 can match an address of a site included in the applicant data 115 with an address of the site included in the grid operator data 125. The enrollment engine 132 may use a third-party verification service to translate the addresses contained in the applicant data 115 and the grid operator data 125 to standard representations of the address, such as United States Postal Service addresses. The addresses may be translated via the third-party verification service so that the addresses may be matched with exact characters. For example, if a user inputs applicant data 115A including an address of "E Penny Ln" and the grid operator data 125 includes an address of "East Penny Lane," the third-party verification service may translate the addresses. The addresses may be translated so that the address of the applicant data 115A matches the address of the grid operator data 125.

Additionally, or alternatively, the enrollment engine 132 can be configured to perform name verification 135. In this instance, the enrollment engine 132 can be configured to evaluate names of users included in the applicant data 115. For example, the enrollment engine 132 may compare a name included in the applicant data 115 that is associated with a particular site, with a service name corresponding to a utility account for the particular site that is contained in the grid operator data 125. In some aspects, the enrollment engine 132 may determine whether exact matches exist between user names and service names. In other aspects, the enrollment engine 132 may determine whether partial matches, such as a match between 75% of the characters, exist between the characters of user names and service names.

Further, the enrollment engine 132 can be configured to perform eligibility verification 136. In this instance, the enrollment engine 132 can be configured to evaluate additional criteria to confirm whether or not an applicant is eligible for enrollment. For example, the enrollment engine 132 may be configured to compare a geographic region of a site associated with the particular applicant to a list of pre-validated geographic regions. As such, the enrollment engine 132 may identify whether or not the geographic region of the site satisfies predetermined conditions for enrollment in a particular energy management program, such as a being located in a pre-validated neighborhood. In another example, the enrollment engine 132 may provide a real-time verification of enrollment eligibility to an applicant. This will be further described below with respect to FIG. 6.

The enrollment engine 132 can be configured to perform one or more evaluations of enrollment verification 133. In some aspects, the enrollment engine 132 proceeds to additional steps of enrollment verification 133 upon the verification of certain criteria. For example, the enrollment engine 132 may initially perform address verification 134 for each applicant. If the address of an applicant is verified, then the enrollment engine 132 may be configured to perform name verification 135. As such, the criteria included in the enrollment verification 133 may be verified by the enrollment engine 132 sequentially, in parallel, or both.

The enrollment engine 132 can be configured to generate an enrollment recommendation 137 based on the enrollment verification 133. The enrollment engine 132 may generate a single enrollment recommendation 137 for each set of applicant data 115A-N. The enrollment recommendation 137 can include a recommendation to accept or reject each particular applicant. For example, the enrollment engine 132 can recommend acceptance of a particular applicant when the particular applicant has been verified by all the criteria included in the enrollment verification 133. In another example, the enrollment engine 132 can recommend rejection of a particular application when the particular application has not been verified by all of the criteria indicated in the enrollment verification 133. In particular, a particular application that has not been verified may not match the data provided from the grid operator data. Alternatively, the particular application that has not been verified may match the grid operator data and has been flagged by the enrollment engine 132 as not being eligible for a recommended acceptance.

The enrollment recommendation 137 may be provided for output by the enrollment server 130. The enrollment recommendation 137 may be provided for output to the computing device 110 of the user applying for enrollment in the energy management program over the network 102. The enrollment recommendation 137 can be provided for output to a grid operator who is facilitating operation of the particular energy management program. In this instance, the grid operator may review the enrollment recommendation 137 to determine whether or not to accept/reject the particular applicant for the energy management program.

In some implementations, the enrollment engine 132 may provide an automated enrollment output instead of an enrollment recommendation 137. The enrollment engine 132 may generate a single automated enrollment output for each new set of applicant data 115A-N based on the enrollment verification 133. For example, the enrollment engine 132 may automatically accept each particular applicant that applies for enrollment in a particular energy management program in response to the enrollment engine 132 verifying certain criteria for the particular applicant. In another example, the enrollment engine 132 may automatically reject each particular applicant that applies for enrollment in a particular energy management program in response to the enrollment engine 132 verifying that the applicant data does not meet the certain criteria for the particular applicant. The enrollment engine 132 may verify certain criteria such as address verification 134 and name verification 135 if the address of the applicant is verified, and one or more additional criteria in the eligibility verification 136. In this instance, the grid operator may be notified of the acceptance of the particular applicant for the energy management program.

The enrollment server 130 can be a database server including one or more storage devices, such as a database. The results of the enrollment verification 133 for the users applying for enrollment can be stored in the database. In certain aspects, the results of the enrollment verification 133 can be stored in the database for future reference by the enrollment server 130. For example, the enrollment engine 130 of the server 130 may reference a user who has been previously evaluated for enrollment a first energy management program, to generate an enrollment recommendation for the user with respect to a second energy management program. The enrollment server 130 can store various data in the database. For example, the enrollment server 130 can store applicant data 115, grid operator data 125, and the like, in the database for future reference.

Figure 2:
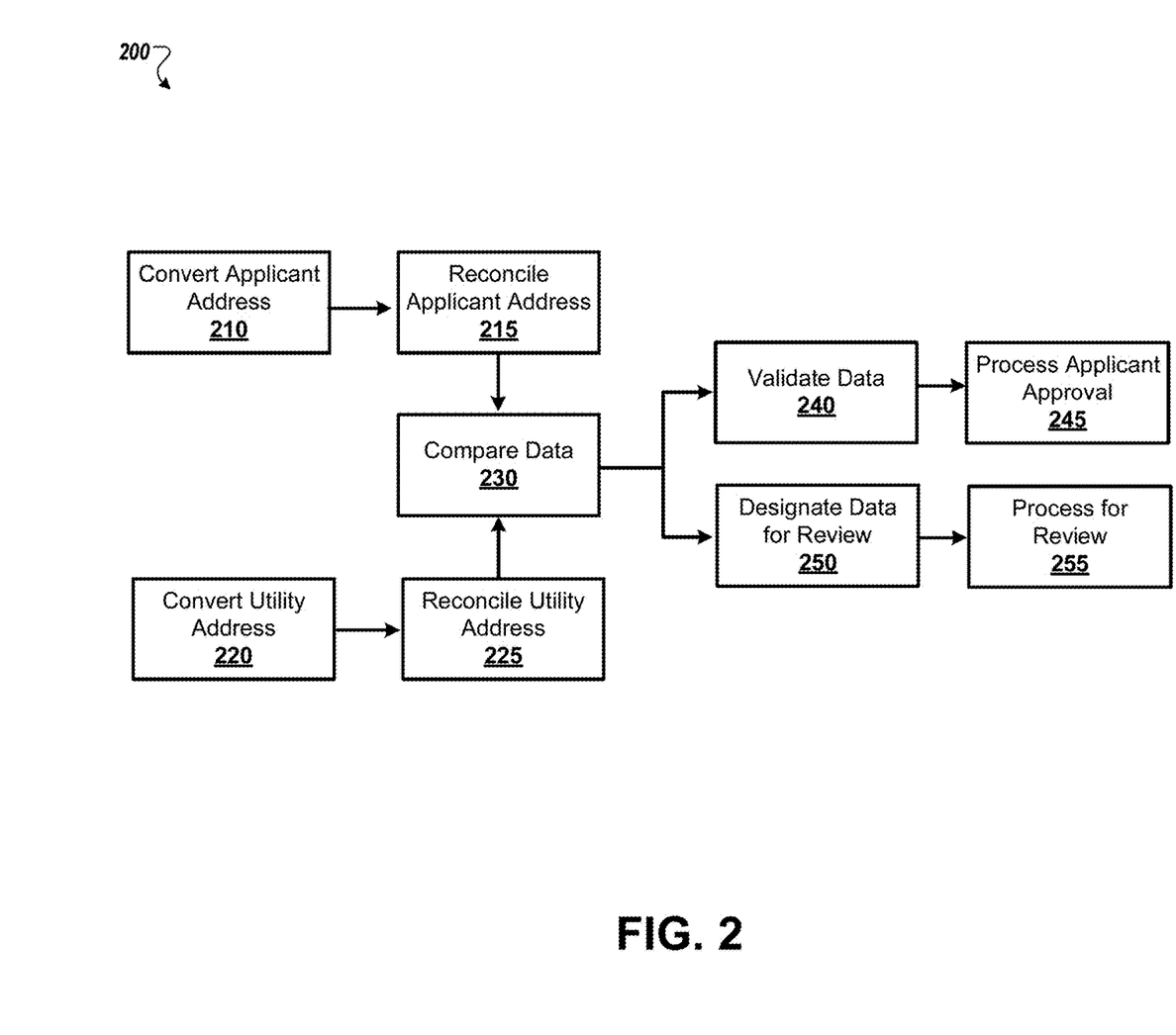
FIG. 2 is a diagram of an example workflow for enrollment verification.

FIG. 2 is a diagram of an example workflow 200 for enrollment verification. The workflow 200 describes a process of automated applicant verification. The automatic verification of applicants improves enrollment processing efficiency and accuracy while permitting a grid operator to review the enrollment recommendation for approval. The workflow 200 describes an enrollment server, such as enrollment server 130 of FIG. 1, that compares applicant data and utility data to verify applicant enrollment in energy management programs.

The enrollment server can be configured to receive applicant supplied information, such as an address of a site associated with the applicant. In some implementations, the enrollment server can be configured to receive the applicant submitted information in various manners. For instance, the enrollment server can receive the applicant data over an application programming interface (API), a file provided by the applicant, or using a machine to machine connection. In this instance, the enrollment server can convert the applicant address to a standard format 210 for processing. For example, the enrollment server may receive a particular address of an applicant via an enrollment interface displayed at a computing device. The particular address may be parsed from the enrollment interface and translated into a standard format so that all addresses of the enrollment server are of the same, standard format. The enrollment server may reconcile the formatted applicant address 215. For example, the enrollment server may reconcile the standard format address with a United States Postal Service (USPS) database. In this instance, the particular address may be compared to addresses in the USPS database so that the formatted address is consistent with USPS format. The particular address is formatted and reconciled with a standardized database of addresses, such as the USPS database, in preparation for verification and processing.

The enrollment server can also be configured to receive grid operator supplied information, such as an address of the site associated with the applicant. In some implementations, the enrollment server can be configured to receive the grid operator supplied information in various manners, similar to receiving the applicant submitted information. For instance, the enrollment server can receive the grid operator supplied information over an API, a file provided by the grid operator, in HTML form, or from a mobile device. As such, the grid operator supplied information may be the same or different from the applicant supplied information. Therefore, the grid operator information is initially converted to standard format 220, for processing. For example, the enrollment server may receive a particular address of a site via a grid operator database. The grid operator address may be translated into a standard format that is consistent with other addresses being evaluated by the enrollment server. The enrollment server may reconcile the standard format grid operator address 225. For example, the enrollment server may reconcile the standard format grid operator address with the USPS database. In this instance, the grid operator address may be compared to addresses in the USPS database so that the formatted address is ensured to be consistent with USPS format. The grid operator address is formatted and reconciled with a standardized database of addresses, such as the USPS database, in preparation for verification and processing.

The enrollment server compares 230 the reconciled addresses 215 and 225 to verify the applicant supplied information. In other words, the applicant supplied address is checked against the grid operator information to verify that the information is consistent. The accuracy of this evaluation is further verified due to the consistency in formatting of the two addresses in addition to the reconciliation of each address with the USPS database.

The enrollment server compares 230 the supplied addresses to generate an enrollment recommendation for each particular applicant. As such, the enrollment server may determine that the addresses are consistent with one another, and therefore validate 240 the applicant supplied data. In this instance, the enrollment server may process the applicant supplied data/information, or the applicant's request for enrollment in a particular energy management program, for approval 245 by a corresponding grid operator. On the other hand, the enrollment server may determine that the addresses are inconsistent with one another. In this example, the enrollment server may designate the applicant, and the applicant supplied information, for further review 250. As such, the enrollment server may process the applicant supplied data/information, or the applicant's request for enrollment in the particular energy management program, for review 255 and possible rejection of enrollment by the corresponding grid operator. Alternatively, the enrollment server may automatically accept the applicant for enrollment in the particular energy management program after passing the addresses through the review 250 and bypassing the addresses through the process for review 255.

Figure 3:
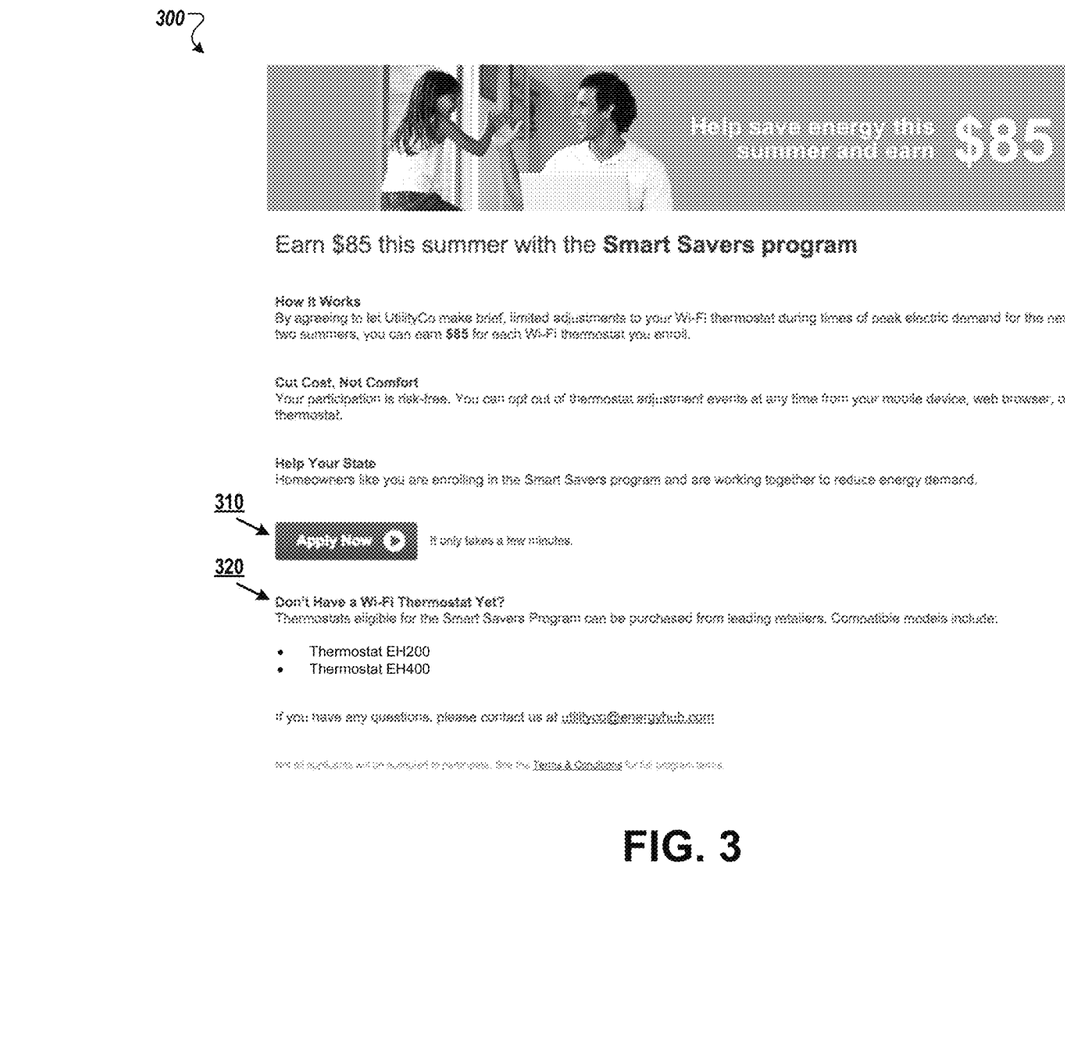
FIG. 3 is an exemplary interface for enrolling an applicant.

FIG. 3 is an exemplary interface 300 for enrolling an applicant. The interface 300 enables a particular energy consumption system of the applicant to be enrolled in an energy management program, such as a demand response event. As such, the consumption system can be adjusted during a demand response event. The interface 300 can include a link to apply for enrollment 310 and one or more links to be directed to consumption systems capable of enrollment 320.

The link to apply for enrollment 310 can enable a potential applicant or user associated with a consumption system to apply for enrollment in demand response programs. The application for enrollment can require information regarding consumption systems as well as the sites of the consumption systems. For example, the application for enrollment can ask for a type of the consumption system. In another example, the application can ask for a geographic location of the site. In certain aspects, by following the link to apply for enrollment 310 and completing the respective application, a user may be automatically enrolled in all future demand response events.

The one or more links to consumption systems capable of enrollment 320 may be used to provide a user with access to consumption systems capable of enrolling in firm load dispatch. As such, the user may be provided with multiple options of consumption systems that can be enrolled in demand response events. The one or more links to consumption systems capable of enrollment 320 can aid users in applying for enrollment. For example, if a user was denied enrollment due to an incompatible consumption system, the user may wish to use the links 320 to enroll in the demand response program using a different consumption system.

Figure 4:
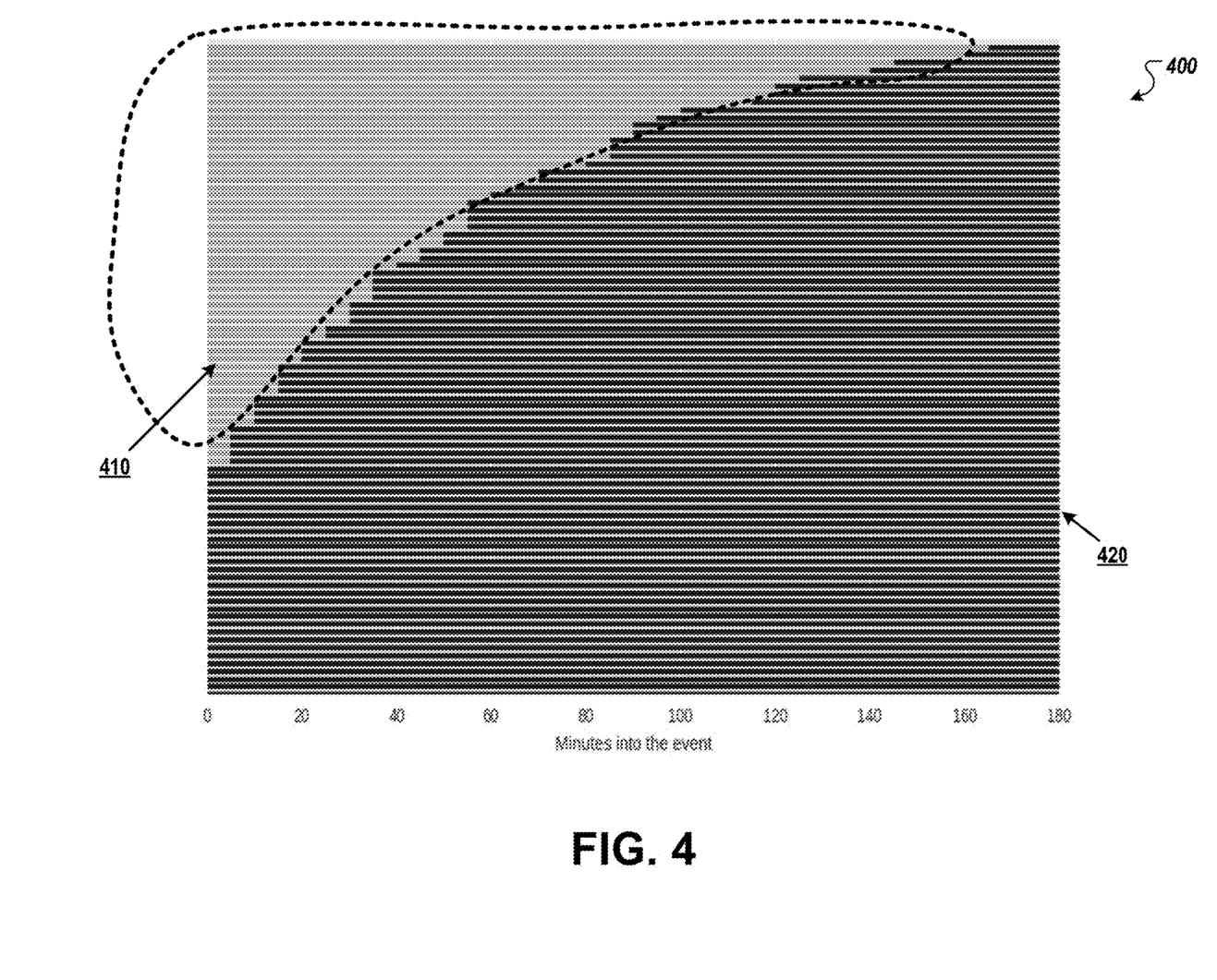
FIG. 4 is an exemplary diagram of setback events.

FIG. 4 is an exemplary diagram of setback events 400. The diagram of setback events 400 illustrates setback events that are provided to consumption systems over the duration of a demand response event included in a particular energy management program. Specifically, FIG. 4 illustrates setback events being provided to each of a plurality of consumption systems for a demand response event.

The diagram of setback events 400 includes horizontal bars that represent the control of individual consumption system (each bar may correspond to a particular consumption system.) The light-shaded horizontal bars 410 represent consumption systems that are in a state prior to the implementation of setback events. On the other hand, the dark-shaded horizontal bars 420 represent consumption systems that are undergoing setback events at particular points in time.

Over the duration of the demand response event, a subset of consumption systems enrolled in the demand response event are provided with setback events. The setback events 400 correspond to a single control strategy. Referring to FIG. 4, although the consumption systems may include differing dispatch times, as indicated by beginning of each dark-shaded horizontal bar 420, all of the consumption systems in the subset are constrained to end at the conclusion of period of time corresponding to the demand response event, such as at 180 minutes in FIG. 4.

As such, the control strategy implemented by the firm load dispatch system may not utilize all of the enrolled sites or consumption systems associated with the sites. Additionally, the control strategy implemented by the firm load dispatch system may not need to provide adjustments over the entire duration of the optimized demand response event to each of the consumption systems being adjusted.

Figure 5:
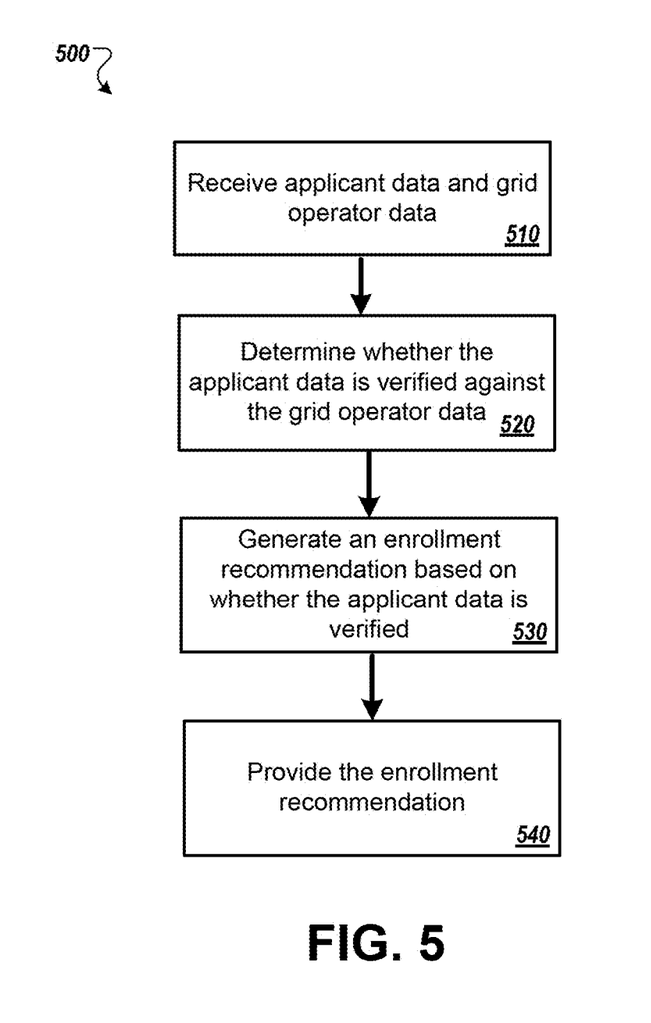
FIG. 5 is a flow chart illustrating an example process for generating an enrollment recommendation.

FIG. 5 is a flow chart illustrating an example process 500 for generating an enrollment recommendation. The process 500 can be performed by one or more servers or other computing devices. For example, operations of the process 500 can be performed by enrollment server 130 of FIG. 1. Operations of the process 500 can also be implemented as instructions stored on a non-transitory computer readable medium, and when the instructions are executed by the one or more servers (or other computing devices) the instructions cause the one or more servers to perform operations of the process 500.

At step 510, the enrollment server receives applicant data and grid operator data. The applicant data may be supplied by an applicant via an enrollment interface of a computing device. For example, the enrollment server may transmit data for execution of an enrollment interface at the computing device. The computing device may execute the data for presentation of the enrollment interface. A user may provide information at the enrollment interface to apply for enrollment in a particular energy management program. In some aspects, the applicant data can include a name of the user applying for enrollment, an address of a site the user is requesting to enroll in the energy management program, and the like.

The grid operator data may be supplied by a grid operator and/or accessed at a grid operator database by the enrollment server. For example, the grid operator data may include names of users and addresses of sites associated with the users. The grid operator data may be transmitted to the enrollment server periodically. As such, the grid operator data may be updated every 30 minutes, every hour, every day, and the like, by automatically transmitting updated grid operator data from the grid operator to the enrollment server. In another example, the grid operator data may be accessed by the enrollment server at the grid operator database upon receiving the applicant data. In this instance, the enrollment server may request access to specific data of the grid operator database for evaluation of the applicant data.

At step 520, the enrollment server determines whether the applicant data is verified against the grid operator data. In this instance, the enrollment server attempts to match the applicant data with the grid operator data. As such, the enrollment server verifies the eligibility of the applicant or user applying for enrollment in each particular energy management program. The enrollment server may verify the eligibility of each applicant by comparing various information supplied by the applicant against the information supplied by the grid operator. In some examples, the enrollment server verifies information such as an address of a site associated with the applicant, a name of the applicant, a neighborhood of the site associated with the applicant, and the like.

At step 530, the enrollment server generates an enrollment recommendation based on whether the applicant data is verified. The enrollment server may generate an enrollment recommendation that indicates whether the applicant is recommended for enrollment in the particular energy management program. For example, if the applicant data is verified by the enrollment server, the recommendation may be generated to indicate that the applicant is approved for enrollment. In another example, if the applicant data is not verified by the enrollment server, the recommendation may be generated to indicate that the applicant is rejected for enrollment. In another example, the enrollment server may generate an automated enrollment output for each applicant applying for the particular energy management program. The automated enrollment output indicates that the applicant is approved (or accepted) for enrollment after verifying one or more criteria of the applicant.

At step 540, the enrollment server provides the enrollment recommendation for output. The enrollment server may provide pre-approved applicants for approval to the corresponding grid operator. Additionally, the enrollment server may flag applicants that have not been verified for further gird operator review that have not been verified. In some aspects, the accepted and rejected applicants may each be transmitted to the corresponding grid operator individually for approval or further review. In other aspects, the accepted and rejected applicants may be compiled into lists of multiple applicants. In this instance, the enrollment server may transmit the lists of accepted and rejected applicants for batch approval or further review once the lists satisfy predetermined thresholds, such as a transmitting a list when it has reached a certain number of applicants, transmitting a list at a certain point in time every day, and the like.

Figure 6:
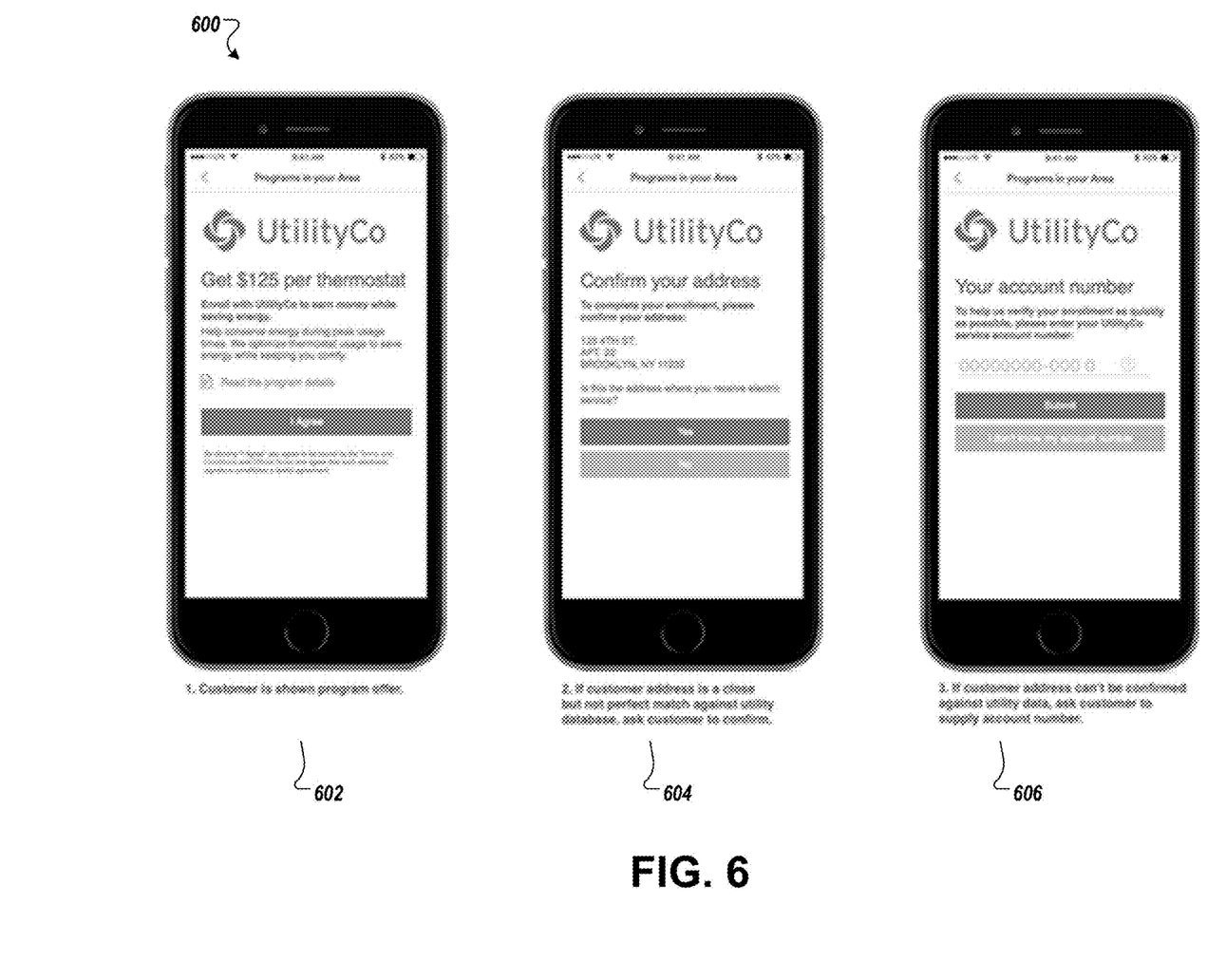
FIG. 6 is an exemplary diagram of enrolling an applicant using real-time verification.

FIG. 6 is an exemplary diagram of enrolling an applicant using real-time verification. The diagram 600 illustrates various displays of a client device, such as computing device 110*a*, during the real-time verification. The enrollment engine 132 can be configured to provide a request to the computing device 110*a* to evaluate additional criteria to confirm whether or not an applicant is eligible for enrollment in real-time fashion. For instance, as shown in display 602, the enrollment engine 142 provides a request to the client device for enrolling in the energy management program. The applicant interacts with the display of the client device to accept and apply to the energy management program.

In 604, the applicant enters the address of the site in the applicant data 115 in the client device. The client device transmits the applicant data 115 to the enrollment server 130. In particular, the enrollment engine 132 in the enrollment server 140 performs address verification 134 to determine if the entered address of the site matches with an address included in the grid operator data 125. The enrollment engine 132 will transmit a request to the client device if the entered address only partially matches to the address in the grid operator data 125. For example, if the address in the applicant data 115 and the address in the grid operator data 125 differ by a few letters in the city name, the enrollment engine 132 will transmit a request to the client device for further verification. The request can include the address found in the grid operator data 125 and a request for the applicant to indicate if the address found in the grid operator data 125 is the correct address. In response, the applicant can interact with the client device to indicate a "Yes" response or a "No" response, which is transmitted to the enrollment server 130. If the applicant indicates "Yes," then the enrollment engine 132 receives the "Yes" indication and proceeds to accept the applicant's enrollment verification.

If the applicant enters "No" on the display screen illustrated in 604, the enrollment engine 132 receives the "No" indication and proceeds to transmit a request to display 606 that includes a user interface for requesting the applicant to input a customer account number. In some implementations, the customer account number can be a number previously registered with the enrollment engine 132 for a different site. The customer account number also can be a number previously registered with the enrollment engine 132 for the same site that has since expired or requires different utility data. Should the customer account number match a number previously registered with the enrollment engine 132, the enrollment engine 132 can accept the applicant's enrollment application to the energy management program.

The enrollment engine 132 can provide a real time verification of the applicant in response to either a confirmed address or an accepted account number, as illustrated in 604 or 606 respectively. By performing a real time verification, the applicant is able to more quickly determine the corresponding enrollment status.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. An energy management system comprising:
one or more computers and one or more computer-readable media storing instructions that, when executed by the one or more computers, cause the one or more computers to perform operations comprising:
transmitting, by the energy management system over a network and to a client device, data indicating an enrollment interface i) for display at the client device that requests input of applicant data for an enrollment application for an applicant applying for a particular energy management program, ii) that comprises multiple interactive links for multiple consumption devices associated with the applicant to be included in the particular energy management program;
receiving, by the energy management system from the client device, the applicant data to execute the enrollment application for the applicant applying for the particular energy management program, wherein receiving the applicant data further comprises:
receiving, by the energy management system, a selection of a subset of the multiple consumption devices from the client device by the applicant to be included in the particular energy management program;
accessing, by the energy management system, grid operator data a) that indicate one or more compatible devices and b) for use in verifying against the applicant data;
determining, by the energy management system, whether the selection of the subset of the multiple consumption devices verifies to the grid operator data that indicate the one or more compatible devices and the selected consumption devices are compatible;

in response to determining that the selected consumption devices are compatible, generating, by the energy management system, an enrollment recommendation that corresponds to the applicant for the particular energy management program, wherein generating the enrollment recommendation comprises:
determining that at least a first portion of the applicant data verifies to the grid operator data and at least a second portion of the applicant data does not verify to the grid operator data,
in response to determining that at least the first portion of the applicant data verifies to the grid operator data and at least the second portion of the applicant data does not verify to the grid operator data, generating, by the energy management system, a first request for further verification that includes at least a part of the grid operator data and a second request for the applicant to indicate whether the part of the grid operator data is correct,
transmitting, by the energy management system, the first request to the client device for verification of whether the part of the grid operator data is correct,
receiving, by the energy management system, a response to the first request from the client device that indicates whether the part of the grid operator data is correct, and generating the enrollment recommendation based on the received response to the first request from the client device that indicates whether the part of the grid operator data is correct;
providing, by the energy management system, the enrollment recommendation to a grid operator device for review of whether to accept or reject the enrollment application to the particular energy management program; and
in response to receiving an acceptance for the enrollment application, controlling, by the energy management system, the subset of the multiple consumption devices associated with the applicant, the controlling comprising providing, by the energy management system, a set of setback events to two or more of the subset of the multiple consumption devices during at least a subset of a duration of a demand response event.

2. The system of claim 1, the operations further comprising:
transmitting, by the energy management system, data indicating a request to access the grid operator data at a grid operator database.

3. The system of claim 1, the operations further comprising:
in response to receiving the applicant data, transmitting, by the energy management system, data indicating a request to access the grid operator data at a grid operator database.

4. The system of claim 1, wherein determining whether the applicant data verifies to the grid operator data further comprises:
comparing, by the energy management system, data indicated by the applicant data to data indicated by the grid operator data; and
in response to the comparing, determining, by the energy management system, whether a match exists between the data indicated by the applicant data and the data indicated by the grid operator data.

5. The system of claim 4, wherein the applicant data comprises an address of a site, a geographic region of a site, thermostat verification data, data of the multiple consumption devices, historical data, indications of previously enrolled data for the applicant, one or more client devices corresponding to the applicant, and a name of the applicant; and the grid operator data comprises a list of pre-validated addresses of sites, and a list of pre-validated geographic regions.

6. The system of claim 1 wherein the enrollment recommendation comprises at least a recommendation to accept or reject the enrollment application for enrollment in the particular energy management program.

7. The system of claim 1, wherein generating, by the energy management system, the request for further verification that includes at least the first part of the grid operator data and the second request for the applicant to indicate whether the part of the grid operator data is correct comprises generating, by the energy management system, the first request for further verification that includes the part of the grid operator data that corresponds to the second portion of the applicant data that does not verify to the grid operator data.

8. The system of claim 1, wherein generating, by the energy management system, the first request for further verification that includes at least the part of the grid operator data and the second request for the applicant to indicate whether the part of the grid operator data is correct comprises generating, by the energy management system, the first request for further verification of an address of the applicant.

9. The system of claim 1, wherein determining that at least the first portion of the applicant data verifies to the grid operator data and at least the second portion of the applicant data does not verify to the grid operator data comprises determining that a first set of characters of an address provided in the applicant data verifies to the grid operator data and a second set of characters of the address provided in the applicant data does not verify to the grid operator data.

10. The system of claim 1, wherein generating the enrollment recommendation based on the received response to the first request from the client device that indicates whether the part of the grid operator data is correct comprises determining to accept the enrollment application based on the received response to the first request from the client device indicating that the part of the grid operator data is correct.

11. The system of claim 1, wherein generating the enrollment recommendation based on the received response to the first request from the client device that indicates whether the part of the grid operator data is correct comprises determining to request an account number for the enrollment application based on the received response to the first request from the client device indicating that the part of the grid operator data is not correct.

12. The system of claim 1, the operations further comprising:
in response to determining that at least one of a second set of selected consumption devices of a second applicant is incompatible:
receiving, by the energy management system, a different selection of multiple consumption devices from a second client device by the second applicant to be included in the particular energy management program;

determining, by the energy management system, whether the different selection of the multiple consumption devices verifies to second grid operator data; and in response to determining that one of the different selected consumption devices verifies to the second grid operator data, generating, by the energy management system, a second enrollment recommendation that corresponds to the second for the particular energy management program.

13. The system of claim 1, wherein controlling the subset of the multiple consumption devices associated with the applicant further comprises:

providing, by the energy management system, a set of setback events to two or more of the subset of the multiple consumption devices during the duration of the demand response event.

14. An energy management system comprising:

one or more computers and one or more computer-readable media storing instructions that, when executed by the one or more computers, cause the one or more computers to perform operations comprising:

transmitting, by the energy management system over a network and to each of two or more client devices, data indicating an enrollment interface i) for display at the respective client device that requests input of applicant data for an enrollment application for a respective applicant applying for a particular energy management program, ii) that comprises multiple interactive links for respective multiple consumption devices associated with the respective applicant to be included in the particular energy management program;

receiving, by the energy management system from each of the two or more client devices, respective applicant data to execute a respective enrollment application for the respective applicant applying for a particular energy management program, wherein receiving the respective applicant data further comprises:

receiving, by the energy management system, a respective selection of a subset of the respective multiple consumption devices from the respective client device by the respective applicant to be included in the particular energy management program;

accessing, by the energy management system, grid operator data a) that indicate one or more compatible devices and b) for use in verifying against the applicant data;

for a first client device from the two or more client devices:

determining, by the energy management system, whether the selection of the respective subset of the respective multiple consumption devices verifies to the grid operator data that indicate the one or more compatible devices; and in response to determining that one of the respective selected consumption devices is incompatible, generating, by the energy management system, an enrollment recommendation that denies the respective applicant for the particular energy management program;

for a second client device from the two or more client devices:

determining, by the energy management system, whether the respective applicant data verifies to the grid operator data; and in response to determining whether the respective applicant data verifies to the grid operator data, generating, by the energy management system, a respective enrollment recommendation that corresponds to the respective applicant for the particular energy management program; and providing, by the energy management system, one or more enrollment recommendations, including the respective enrollment recommendation for the second client device, to a grid operator device for review of whether to accept or reject at least some of the enrollment applications for the particular energy management program, wherein providing the one or more enrollment recommendations further comprises:

generating, by the energy management system, an applicant list comprising accepted and rejected applicants that includes a second applicant for the second client device;

comparing, by the energy management system, a size of the applicant list to a predetermined threshold value;

in response to comparing the size of the applicant list to the predetermined threshold value, transmitting, by the energy management system, the applicant list to the grid operator device based on the size of the applicant list meeting the predetermined threshold value; and in response to receiving an acceptance for the enrollment application from the grid operator device, controlling, by the energy management system, two or more devices from the respective subset of the respective multiple consumption devices associated with the second client device by providing a set of setback events to the two or more of the respective subset of the respective multiple consumption devices during at least a subset of a duration of a demand response event.

15. A method performed by an energy management system that includes one or more computers and one or more computer-readable media storing instructions that, when executed by the one or more computers, cause the energy management system to perform operations, the method comprising:

transmitting, by the energy management system over a network and to a client device, data indicating an enrollment interface i) for display at the client device that requests input of applicant data for an enrollment application for an applicant applying for a particular energy management program, ii) that comprises multiple interactive links for multiple consumption devices associated with the applicant to be included in the particular energy management program;

receiving, by the energy management system from the client device, the applicant data to execute the enrollment application for the applicant applying for the particular energy management program, wherein receiving the applicant data further comprises:

receiving, by the energy management system, a selection of a subset of the multiple consumption devices from the client device by the applicant to be included in the particular energy management program;

accessing, by the energy management system, grid operator data a) that indicate one or more compatible devices and b) for use in verifying against the applicant data;

determining, by the energy management system, whether the selection of the subset of the multiple consumption devices verifies to the grid operator data that indicate the one or more compatible devices and the selected consumption devices are compatible;

in response to determining that the selected consumption devices are compatible, generating, by the energy management system, an enrollment recommendation that corresponds to the applicant for the particular energy management program, wherein generating the enrollment recommendation comprises:

determining that at least a first portion of the applicant data verifies to the grid operator data and at least a second portion of the applicant data does not verify to the grid operator data,     in response to determining that at least the first portion of the applicant data verifies to the grid operator data and at least the second portion of the applicant data does not verify to the grid operator data, generating, by the energy management system, a first request for further verification that includes at least a part of the grid operator data and a second request for the applicant to indicate whether the part of the grid operator data is correct,     transmitting, by the energy management system, the first request to the client device for verification of whether the part of the grid operator data is correct,     receiving, by the energy management system, a response to the first request from the client device that indicates whether the part of the grid operator data is correct, and     generating the enrollment recommendation based on the first received response to the request from the client device that indicates whether the part of the grid operator data is correct;

providing, by the energy management system, the enrollment recommendation to a grid operator device for a determination of whether to accept or reject the enrollment application to the particular energy management program; and in response to receiving an acceptance for the enrollment application, controlling, by the energy management system, the subset of the multiple consumption devices associated with the applicant, the controlling comprising providing, by the energy management system, a set of setback events to two or more of the subset of the multiple consumption devices during at least a subset of a duration of a demand response event.

16. The method of claim 15, further comprising:

transmitting, by the energy management system, data indicating a request to access the grid operator data at a grid operator database.

17. The method of claim 15, further comprising:

in response to receiving the applicant data, transmitting, by the energy management system, data indicating a request to access the grid operator data at a grid operator database.

18. The method of claim 15, wherein determining whether the applicant data verifies to the grid operator data further comprises:

comparing, by the energy management system, data indicated by the applicant data to data indicated by the grid operator data; and     in response to the comparison, determining, by the energy management system, whether a match exists between the data indicated by the applicant data and the data indicated by the grid operator data.

19. The method of claim 18, wherein the applicant data comprises an address of a site, a geographic region of a site, and a name of the applicant; and the grid operator data comprises a list of pre-validated addresses of sites, and a list of pre-validated geographic regions.

20. The method of claim 15, wherein the enrollment recommendation comprises at least a recommendation to accept or reject the enrollment application for enrollment in the particular energy management program.

* * * * *

UNITED STATES PATENT AND TRADEMARK OFFICE
CERTIFICATE OF CORRECTION

| | | |
|---|---|---|
| PATENT NO. | : 11,430,022 B1 | Page 1 of 1 |
| APPLICATION NO. | : 16/102215 | |
| DATED | : August 30, 2022 | |
| INVENTOR(S) | : Jonah Gold et al. | |

It is certified that error appears in the above-identified patent and that said Letters Patent is hereby corrected as shown below:

On the Title Page

Column 1 (item (73) Assignee), Line 1, delete "Energy Hub," and insert -- EnergyHub, --.

In the Claims

In Claim 7, Column 14, Line 18 (approx.), after "system, the" insert -- first --.

In Claim 7, Column 14, Line 19 (approx.), after "at least the" delete "first".

In Claim 12, Column 15, Line 10 (approx.), after "second" insert -- applicant --.

In Claim 15, Column 17, Line 36, after "the" delete "first".

In Claim 15, Column 17, Line 36, after "response to the" insert -- first --.

Signed and Sealed this
First Day of November, 2022

*Katherine Kelly Vidal*

Katherine Kelly Vidal
*Director of the United States Patent and Trademark Office*